Jan. 7, 1941. A. RONNING Re. 21,685

STEERABLE VEHICLE TRUCK

Original Filed Dec. 5, 1938 2 Sheets-Sheet 1

INVENTOR
ADOLPH RONNING
BY Carlson & Hagle
ATTORNEY

Jan. 7, 1941. A. RONNING Re. 21,685

STEERABLE VEHICLE TRUCK

Original Filed Dec. 5, 1938 2 Sheets-Sheet 2

INVENTOR
ADOLPH RONNING
BY Carlson & Hagle
ATTORNEY

Reissued Jan. 7, 1941

Re. 21,685

UNITED STATES PATENT OFFICE 21,685

STEERABLE VEHICLE TRUCK

Adolph Ronning, Minneapolis, Minn.

Original No. 2,208,601, dated July 23, 1940, Serial No. 244,019, December 5, 1938. Application for reissue August 23, 1940, Serial No. 353,989

23 Claims. (Cl. 280—87)

This invention relates to steerable supporting units or trucks for wheeled vehicles, particularly of the self-propelled type, and the primary object is to provide a novel, efficient, and practical means for mounting a pair of closely spaced wheels so that they will steer about a common or central vertical axis but yet have freedom for relatively vertical or up and down movement to equalize load stresses to the two wheels, and whereby such equalizing or differential action will greatly facilitate the steering action particularly when the vehicle is traveling and making turns on uneven ground surfaces.

The original application, Serial No. 244,019, upon which this reissue is based, is a continuation in part of my copending application Serial No. 219,369, filed July 15, 1938, and for a disclosure of other forms and modifications of generally similar constructions attention is directed to my Patents Nos. 2,208,599; 2,208,600; 2,209,093; 2,209,094; and 2,209,095, all issued on July 23, 1940, to my Patent No. 2,222,857 issued on November 26, 1940; and to my Patents Nos. 2,217,816, 2,217,817 and 2,217,818, issued on October 15, 1940; and to my copending applications Serial No. 259,361, filed March 2, 1939; Serial No. 311,330, filed December 28, 1939; Serial No. 330,344, filed April 18, 1940; and Serial No. 332,763, filed May 1, 1940.

In the accompanying drawings, illustrating a preferred embodiment of the present inventive concept—

Figure 6:
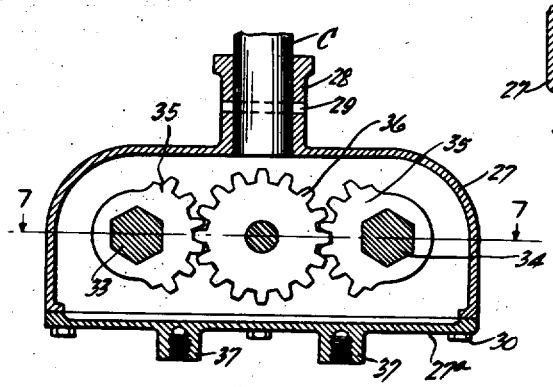
Fig. 6 is a longitudinal vertical section through a modified form of the device.
Figure 7:
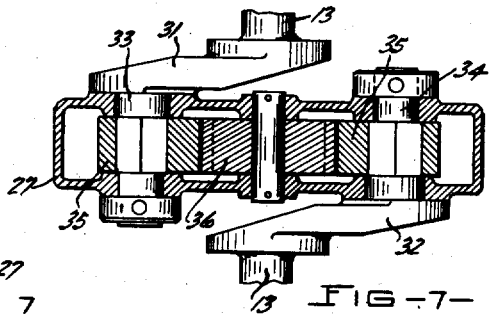
Fig. 7 is a horizontal section on line 7—7 in Fig. 6.
Figure 8:
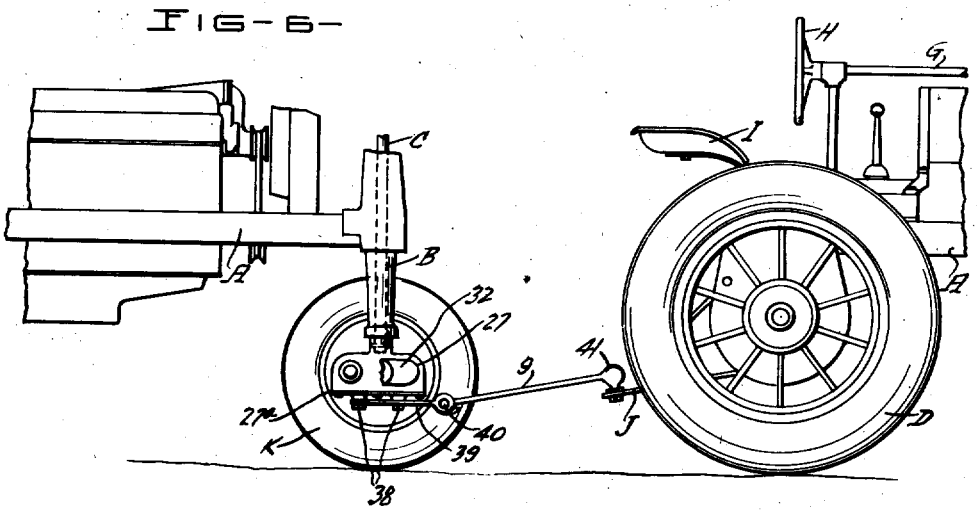
Fig. 8 illustrates a tandem arrangement of tractors in which the steerable truck of the rear tractor is attached to the draw bar of the forward tractor in such a manner that the tractors may trail and be guided one behind the other and without interfering with the vertical action of the truck wheels so guided.

The structure illustrated in Figs. 6 and 7, and applied in Fig. 8, is identical with subject matter illustrated but divided out from my aforesaid application Serial No. 219,369, and to that extent the present application is considered as a continuation in part from said other application.

Figure 1:
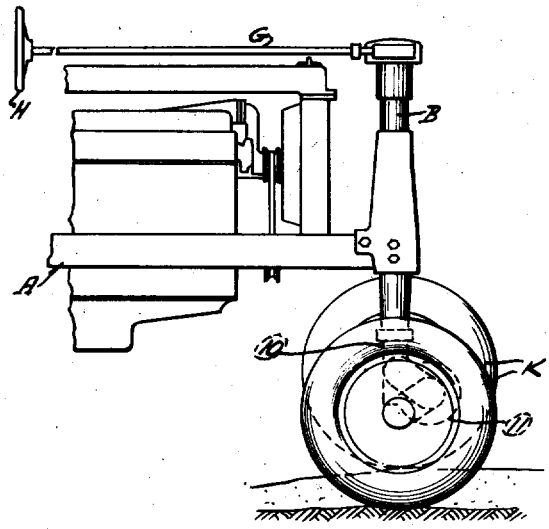
Fig. 1 is a side elevation of the fore part of a tractor illustrating the application of my improved steering truck.
Figure 2:
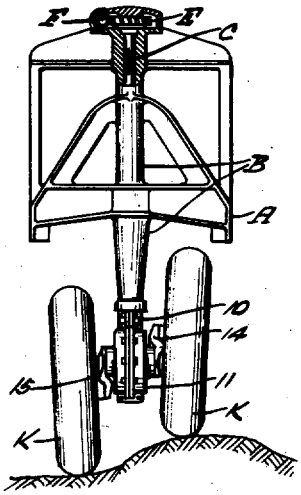
Fig. 2 is a front elevation of the tractor as shown in Fig. 1, and with a part of the steering mechanism in section.

Referring to the drawings more particularly and by reference characters, A designates the frame of a tractor in the front end of which is secured a vertical bearing B in which is journaled a steering post C. At its rear the tractor is provided with the usual transversely spaced traction wheels D, as shown at the right in Fig. 8, which not only support the rear end but also impart the necessary lateral stability. As shown in Fig. 2, the upper end of post C has a worm gear E, operated by worm F on shaft G, and which shaft is in turn rotated by hand wheel H (Figs. 1 and 8) manipulated by the tractor operator on seat I. When the tractors are operated in tandem arrangement the steering wheel H of the rear tractor is not used. In this case a draft link 9 connects the steerable truck of the rear tractor to the draw bar J of the front tractor so that the forward or angular position of the front tractor will guide such truck to steer the rear tractor, and in this case it may further be noted that the worm drive E—F is so pitched that the teeth will not lock but will be free to rotate in response to the steering action imparted by the connecting link 9.

Referring now to Figs. 1–5, it will be seen that the bearing sleeve B is supported on the neck 10 of a housing 11 made up of two complemental sections rigidly secured together by bolts 12. The neck portion 10 is rigidly secured to the lower end of the post so as to turn with it about the post axis.

Figure 3:
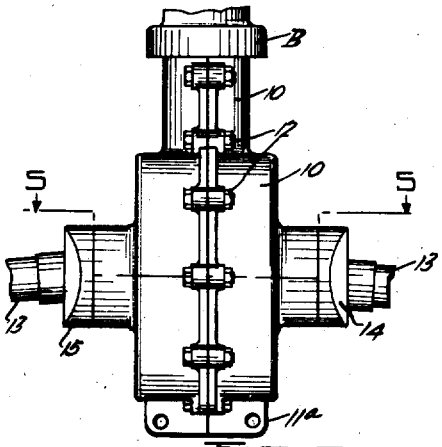
Fig. 3 is an enlarged front end elevation of the housing used in mounting the wheels, but with the wheels removed from the extended stub shafts.

The ground wheels K, preferably of the pneumatic tire type, are closely spaced inasmuch as they are not designed to give lateral stability to the tractor and also because it is desirable to have them travel between crop rows when the tractor is to be used for row crop work. These wheels are mounted on spindles 13, extending rigidly from the rear ends of crank arms 14 and 15, disposed at opposite sides of the housing 11 and provided at their forward ends with stub shafts 16 and 17, respectively, which extend coaxially into the housing and are journaled in anti-friction bearings 18. The spindles 13 are slightly sloped outwardly, as shown in Fig. 3, to give the desired camber to the wheels, as indicated in Fig.

2. It should be noted, however, that any relative up and down movement of the wheels and cranks, about the axes of stub shafts 16—17, will not disturb either the fixed camber angle of the wheels or their relative angle with respect to the steering post, nor will they produce any relatively transverse motion as between the wheels that would result in transverse frictional ground contact. It should also be noted that while the housing 11 projects forwardly from neck 10, the cranks 14—15 both extend rearwardly, with a result that the axes of the wheels K operate directly opposite the post C and in the vertical transverse plane thereof, and consequently their positions or points of ground contact will in no way resist the steering or wheel angling effort.

Figure 5:
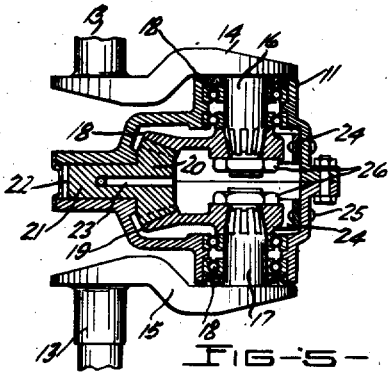
Fig. 5 is a cross section through the housing and enclosed parts, as on line 5—5 in Fig. 3.

The inner ends of the stub shafts 16—17 are rigidly splined, as shown in Fig. 5, in bevel gear segments 18 and 19, respectively, and the gear sectors are operatively connected through an intermeshing, intermediate bevel gear pinion 20. This pinion has an integral stub extension 21 which journals in a bore 22 of the housing. The member 20—21 may be conveniently provided with a duct 23 by which oil contained in housing 11 may be conducted to the gearing bore 22 to lubricate the same.

It will be understood that as the weight of the front end of the tractor is imposed on the housing 10—11 it will be transmitted to the wheels K through the gears 18—20, shafts 16—17, cranks 14—15, and spindles 13, all of which will remain relatively stationary when traveling over level terrain. When uneven ground surface is encountered, however, as indicated in Figs. 1 and 2, then the pinion 20 will differentially function to permit the wheels to assume relative vertical positions, one gear (18 or 19) and its associated crank (14 or 15) being free to oscillate upwardly while the other moves correspondingly downwardly, while at the same time continuing to distribute the applied tractor weight evenly to both wheels.

Figure 4:
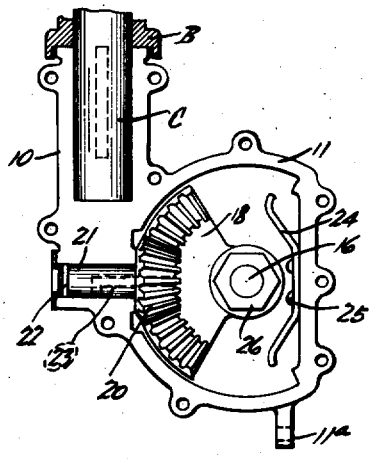
Fig. 4 is a side elevation of the housing with one side section removed to expose the differential mechanism.

There is, of course, a limit to the relative vertical movements of the wheels, and to eliminate objectionable jars or destructive contacts when such movement limits are reached, I provide shock absorber or bumper in the form of springs 24 (Figs. 4 and 5). Each of these springs is anchored at its middle, as at 25, to the front wall of the housing 11, and its upper and lower ends extend resiliently forward to contact the respective upper and lower ends of the adjacent gear segment and thereby yieldingly restrain forward movement thereof as the ground wheels approach their maximum limits of vertical movement.

It may here further be noted that the splining of the shafts 16 and 17 in the respective gear segments is such that by removing nuts 26, after housing 11 has been opened, the segments can be removed and resecured on the shafts in selectively rotated positions, with a result that the composite or normal working angles of cranks 14—15 may be adjusted when necessary. This adjustment is also of course operative to regulate the elevation of the tractor with respect to both of the wheel spindles 13.

In the embodiment of the invention as exemplified by Figs. 6, 7, and 8, the gear case or housing 27 is of more elongated form than that illustrated in Figs. 1–4 and has a neck 28 fixed to the lower end of post C by pin 29. The casing is preferably of solid or integral construction throughout except for a bottom opening shown as closed by a cover plate 27a, secured by bolts 30. In this instance the wheel carrying assemblies include cranks 31 and 32, which support the wheel spindles 13, and extend forwardly and rearwardly, respectively, from the hinge acting stub shafts 33 and 34 that are journaled in opposite, fore and aft ends of the housing, so that, as before, the axes of the wheels will be disposed centrally or in the transverse vertical plane of the steering post C.

Non-rotatably secured on the shafts 33, 34, and within the housing, is a pair of spur gear segments 35, connected by an intermediate, intermeshing spur gear 36 which, it will be seen, has the same compensating action or differential function as that described in connection with the pinion 20 of Figs. 1–5. It may be noted that while the intermediate member 36 has been shown as a full gear, the extreme upper end lower teeth thereof (as seen in Fig. 6) at no time engage the segments 35, and the gear portion which does connect the segments 35 does so in the capacity and with the full effect of a rocker or lever, which lever is fulcrumed on the central pin that extends through it and is anchored in the side walls of the longitudinally extending housing 27.

It will be noted that the housing closure plate 27a is provided with a pair of depending lugs 37 adapted to receive bolts 38 which rigidly secure to the plate a forwardly extending bar 39. The rear end of draft bar 9 is pivoted to this bar 39, as at 40, so that the draft bar can swing vertically but when swung to either side will turn the housing 27 with it to thereby steer the ground wheels K when the tractors are connected in tandem as shown in Fig. 8. The forward end of the draft bar 9 is universally connected, as at 41, to the draw bar J of the tractor so as to provide for the necessary flexibility of movement at this point.

It may be mentioned that in the arrangement illustrated in Fig. 8 the rear vehicle would not necessarily have to be a tractor as a steerable truck embodying my improved features could as well be applied to any kind of drawn vehicle or wheeled implement.

Referring back to Figs. 3 and 4, it will be seen that I have there also provided means in the form of a depending flange 11a, by which a similar trailer attachment might be connected with to apply draft power directly to the steerable truck in that case.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a steerable truck supporting one end thereof and comprising a pair of wheel supported cranks mounted for vertical oscillating movements about transverse centers in vertical planes, and for steerable movements about a common vertical axis the transverse plane of which is substantially coincident with a vertical plane through the axes of the wheels, and gear means differentially connecting the cranks causing them to oscillate in opposite vertical directions.

2. A steerable vehicle supporting truck comprising a member mounted for oscillation about a generally vertical axis to effect steering, a pair of cranks journaled in the member for simultaneous movement therewith about said axis, ground wheels rotatably secured to said cranks, and gear means differentially connecting the journaled ends of the cranks and operative to cause opposite up and down movements thereof and to cause the imposed vehicle weight to be transmitted lengthwise through the cranks and equally distributed to the wheels when and as the truck travels over irregular ground surfaces.

3. A steerable vehicle supporting truck comprising a member mounted for oscillation about a generally vertical axis to effect steering, a pair of cranks journaled in the member for simultaneous movement therewith about said axis, ground wheels rotatably secured to said cranks, gear members connected with the respective cranks, and an intermediate gear differentially connecting said gear members.

4. In a steering truck for vehicles, a mounting member rotatable about an upright axis, wheel supported members secured to the mounting member, one at each side thereof, for oscillating movements, and a gear train differentially connecting said wheel supported members.

5. In a steering truck for vehicles, a mounting member rotatable about an upright axis, a pair of wheel supported cranks carried at opposite sides of the member for oscillation about respective axes spaced with respect to each other, a pair of gear segments connected one with each of said cranks, and a gear member interposed between and differentially connecting said gear segments.

6. In a steering truck for vehicles, a mounting member rotatable about an upright axis, a pair of wheel supported cranks carried at opposite sides of the member for oscillation about a common axis, a pair of opposed bevel gear segments connected one with each crank, and a bevel pinion meshing with and differentially operating the gear segments.

7. In a vehicle, a mounting member, a pair of cranks oscillatably journaled in the mounting member, one at each side thereof, a pair of gear segments attached to the respective cranks to oscillate therewith, means for adjustably attaching one of the segments to the corresponding crank whereby the crank and segment may be relatively adjusted about the common axis thereof, and a gear member differentially connecting the segments.

8. In a vehicle adapted to be drawn, a steerable truck supporting the front end thereof and comprising a mounting member movable about a vertical axis, a pair of wheels mounted one at each side of the member for opposite up and down movements while retaining predetermined face angles with respect to said axis, means, operative from a position on the vehicle, for turning the mounting to steer the wheels, and draft means, independent of said turning means, extending forwardly from the truck for applying pulling and steering action thereto.

9. A vehicle supporting device comprising a housing, a pair of wheel supported crank arms journaled in the housing, and gear means in the housing differentially connecting the journaled ends of the crank arms, said crank arms being journaled for movement about longitudinally spaced axes and extending in opposite directions therefrom.

10. In a vehicle, a pair of crank arms journaled at longitudinally spaced outer ends with respect to the vehicle and with their inner ends separately supported on axially aligned wheels, a pair of gear segments connected with the respective crank arms, and an intermediate gear differentially connecting the segments.

11. In a vehicle, a housing mounted thereon to support the same and including two separable sections, a pair of crank arms journaled one in each of said housing sections to support the housing, ground wheels supporting the respective cranks, and differential mechanism connecting the arms within the housing to move them and their respective wheels in opposite directions.

12. A steerable vehicle supporting truck comprising a member mounted for movement about a generally vertical axis to effect steering, a pair of cranks fulcrumed in the member for simultaneous movements therewith about said axis, ground wheels rotatably secured to said cranks, and a rotatable member differentially connecting the cranks at a point nearer the crank fulcrums than are the axes of the ground wheels to the crank fulcrums to oscillate the cranks and ground wheels in opposite directions.

13. A steerable vehicle supporting truck comprising a member mounted for movements about a generally vertical axis to effect steering, a pair of cranks journaled in the member for simultaneous movement therewith about said axis, ground wheels rotatably secured to said cranks and with their axes disposed approximately in the transverse plane through said generally vertical axes, and a rotatable member differentially connecting the cranks to oscillate the latter in opposite directions, said cranks being mounted for oscillating movements about a common transverse axis and extending in the same general direction therefrom.

14. A steerable vehicle supporting truck comprising a member mounted for rotation about a vertical axis to effect steering, a pair of cranks journaled in the member for simultaneous movement therewith about said axis, ground wheels rotatably secured to said cranks, and a rotatable member differentially connecting the cranks to oscillate the latter in opposite up and down directions, said cranks being mounted for oscillating movements about longitudinally spaced transverse axes, and respectively extending therefrom in generally opposite directions.

15. In a vehicle, a steerable truck therefor comprising a housing mounted for turning movement about a generally upright axis, a pair of wheel supported cranks journaled in the housing for oscillating movements in up and down directions, and gear means in the housing differentially connecting the cranks.

16. In a vehicle, a steerable truck therefor comprising a housing mounted for turning movement about a generally upright axis, a pair of transversely spaced wheel supported cranks journaled in the housing for oscillating movements in longitudinally extending planes, and gear means in the housing differentially connecting the cranks, said gear means including gear elements connected to the respective cranks and an intermediate gear element connecting said gear elements.

17. In a vehicle, a steerable truck therefor comprising a housing mounted for turning movement about a generally upright axis, a pair of transversely spaced wheel supported cranks journaled in the housing for oscillating up and down movements, differentially acting gear means connecting the cranks, and yieldable stop means limiting the oscillating movements of the cranks, said stop means including a resilient member cooperatively associated with the gear means.

18. In a vehicle having a frame, a pair of crank arms pivoted with respect to the frame for movements in transversely spaced paths, ground wheels rotatably secured to the arms, differential mechanism connecting pivoted ends of the arms and operative to distribute imposed vehicle weight equally through both arms to the respective wheels, and means for adjusting the mean working angle of the arms with respect to the horizontal.

19. In a vehicle having a frame, a pair of transversely spaced crank arms pivoted with respect to the frame for oscillating movements while supporting the frame, ground wheels rotatably secured to the arms, gear acting elements connected to the respective arms and at least one of which elements is adjustable with respect to its arm so as to produce angular adjustments of both arms with respect to the horizontal and thereby vertically adjust the frame, and a gear differentially connecting said elements.

20. In a vehicle, a longitudinal member rigid throughout its length, a pair of wheel-carrying assemblies, a horizontal wheel-spindle in each assembly, said wheel-spindles extending in opposite directions, said assemblies hinged to said member for up and down movement in planes spaced constantly the same distance from said member, compensating means connecting said assemblies, said compensating means including a rocker pivotally mounted on a rigid portion of the longitudinal member.

21. In a vehicle, a longitudinal member rigid throughout its length, a pair of wheel-carrying assemblies, a horizontal wheel-spindle in each assembly, said wheel-spindles extending in opposite directions, said assemblies hinged to said member for up and down movement in planes spaced constantly the same distance from said member, compensating means connecting said assemblies, said compensating means including an oscillatable member mounted on a rigid portion of the longitudinal member and in a position such that it will be intersected by a transverse vertical plane passing through the axes of said wheel-spindles.

22. In a vehicle, a longitudinal mounting member, a pair of wheel supported cranks fulcrumed to the mounting member for movement of the wheels in transversely spaced parallel planes, compensating means controlling relative movements of the cranks in said planes comprising an oscillatable member fulcrumed to the mounting member for movement about a transverse axis, and connecting members between the cranks and oscillatable member movable on axes parallel with respect to the transverse fulcrum axis of the oscillatable member.

23. In a vehicle, a longitudinal mounting member, a pair of wheel supported cranks fulcrumed to the mounting member for movement of the wheels in transversely spaced parallel planes, compensating means controlling relative movements of the cranks in said planes comprising an oscillatable member fulcrumed to the mounting member, and connecting members between the cranks and oscillatable member movable on axes parallel with respect to the fulcrum axis of the oscillatable member, said mounting member being of rigid construction whereby the fulcrum axes for the oscillatable member and cranks will be retained in relatively fixed positions.

ADOLPH RONNING.